United States Patent
Herman et al.

[11] Patent Number: 5,907,205
[45] Date of Patent: May 25, 1999

[54] CONSTANT RELUCTANCE ROTATING MAGNETIC FIELD DEVICES WITH LAMINATIONLESS STATOR

[76] Inventors: Robert Wayne Herman, 1034 Baja St., Laguna Beach, Calif. 92651; Timothy James Elliott, 6172 Kimberly Dr., Huntington Beach, Calif. 92647

[21] Appl. No.: 08/905,014

[22] Filed: Aug. 11, 1997

Related U.S. Application Data

[63] Continuation of application No. 08/676,716, Jul. 8, 1996, abandoned.

[51] Int. Cl.$^6$ ..................................................... H02K 21/00
[52] U.S. Cl. ........................... 310/152; 310/156; 310/179; 310/180; 310/184
[58] Field of Search ........................... 310/156, 152, 310/179, 180, 184

[56] References Cited

U.S. PATENT DOCUMENTS

| | | | |
|---|---|---|---|
| 4,071,788 | 1/1978 | Martin et al. | 310/42 |
| 4,292,558 | 9/1981 | Flick et al. | 310/194 |
| 4,389,587 | 6/1983 | Levine et al. | 310/208 |
| 4,424,464 | 1/1984 | Ikegami | 310/68 D |
| 4,492,889 | 1/1985 | Fukushi et al. | 310/87 |
| 4,641,080 | 2/1987 | Glennon | 322/49 |
| 4,709,180 | 11/1987 | Denk | 310/179 |
| 4,725,750 | 2/1988 | Welch | 310/156 |
| 4,837,921 | 6/1989 | Tassinario | 29/596 |
| 4,874,975 | 10/1989 | Hertich | 310/186 |
| 4,908,347 | 3/1990 | Denk | 505/1 |
| 4,954,739 | 9/1990 | Schultz et al. | 310/156 |
| 5,243,248 | 9/1993 | Benford | 310/256 |
| 5,394,321 | 2/1995 | McCleer et al. | 363/131 |
| 5,475,277 | 12/1995 | Johnson | 310/156 |

*Primary Examiner*—Nestor Ramirez
*Assistant Examiner*—Thanh Lam
*Attorney, Agent, or Firm*—Robert Samuel Smith

[57] ABSTRACT

A rotary magnetic field device for use in a dc motor or generator, or an ac motoer or generator. The device has a permanent magnet rotor, stator field windings and an outer cylindrical stator piece preferably being a continuous wire wrapping. The stator wire is magnetically permeable (silicon iron or steel). The stator wire, being transverse to the magnetic field assures low eddy current loss. The rotor is a material having a high energy product ($BH_{max}$) preferably a neodymium-iron-boron compound. When used as a dc motor, the motor is characterized by exhibiting no ripple and economy of construction.

12 Claims, 5 Drawing Sheets

CONSTANT RELUCTANCE ROTATING MAGNETIC FIELD DEVICES WITH LAMINATIONLESS STATOR

This application is a continuation of application Ser. No. 08/676,716 filed Jul. 8, 1996 from which priority is claimed now abandoned.

FIELD OF THE INVENTION

This invention relates to rotating magnetic field devices which, in the context of this specification are understood to include ac and dc motors and generators, alternators and tachometers and particularly toward such devices having a constant reluctance magnetic field alignment to torque and a wire wound stator.

BACKGROUND AND INFORMATION DISCLOSURE

A number of traditional rotating field devices, particularly d.c. motors have been of the type having a permanent magnet (PM) stator rotating armature brush commutator design. In recent years, materials and electronic devices have become available which make possible the construction of permanent magnet rotating field devices in which the magnetic material is contained in the rotor and the electric fields which spin the motor are generated by stator windings surrounding the rotor. Since device efficiency is largely a function of the volume of copper in the windings, the extra copper contained in the stator region of such devices gives this design approach an efficiency advantage for the same size and weight.

In these devices, the electric current is supplied to the spinning windings by sliding contacts on the shaft (called the commutator). As the shaft turns, the direction of the electric current in the windings is automatically switched at the proper time by the placement on the shaft of pads which receive the brush contacts. In the case of brushless devices, the permanent magnet rotates and the windings are stationary so that the switching of the electric current at the proper time to cause the rotor to spin must be accomplished in another way. This is done by electronically switching the electic current supplied to the windings in response to sensing the position of the rotor, usually through the use of optical or magnetic sensors or by analysis of the back e.m.f. waveforms.

FIG. 1 is a sectional radial view showing the configuration of a state of the art PM brushless device such as a dc motor. There is shown a magnet rotor 12 surrounded by a yoke 14. The inner surface of the yoke is proximal to the outer surface of the rotor except that there is an array of slots 16 extending parallel to the axis of the motor in which the windings 18 are captured. The inner face of the yoke 14 is as close as feasible to the surface of the rotor 12 ending in a foot 20 that forms an arc concentric with the radial surface of the rotor magnet 12. The space between the feet 20 and rotor magnet 12 is called the "gap" and the construction is intended to concentrate the flux from the energized windings in the gap.

The flux in the gap of the conventional PM dc motor is, ideally, fixed by the magnet rotor 12 and is little affected by the armature currents. The slots 16 generate what is called "reluctance" torque due to the alternating attraction and repulsion forces between the rotor poles and the slots, causing a ripple in the motor torque.

FIG. 2 shows the form of the magnetic field flux pattern for a conventional PM rotating field device such as a dc motor. Only the left hand side of the pattern is diagramed - - - a diagram of the flux pattern of the right hand side would be a mirror image. The walls of the slots 16 form a "magnetic" circuit which defines a highly permeable path for the concentration of magnetic flux.

There are a number of distinct advantages for rotary field devices such as brushless PM motors. The electric energy supplied to the motor is (primarily) converted into kinetic energy (shaft rotation) and heat (friction and electric losses). Greater efficiency means that more of the electrical energy is converted into kinetic energy and less into heat. Radio frequency noise from brushes is absent, making the motor more interference friendly. Brushes wear out, necessitating maintenance, and also spark, making them dangerous to use in explosive atmospheres. At large rpm's the brushes tend to "fly" over the contacts, thereby increasing the contact resistance, which generates heat, limits the performance of the motor and accelerates the wear on brushes. The brushless motor has none of these disadvantages and therefore has more power, is more reliable and lasts longer than its brush commutated counterpart.

A major source of energy loss in rotating field devices such as a motor occurs in the yoke due to induced or "eddy" currents caused by the changing magnetic fields. To reduce this loss, the yokes are conventionally formed as a stack laminated from many patterns stamped from thin metal sheet. The laminations electrically insulate the sheets thus keeping the eddy currents from propagating in the induced direction. This process of stamping and lamination is one of the more costly steps in the manufacture of the conventional motor.

The development, starting in the mid-1980's, of permanent magnet materials formed of neodymium-iron-boron provides matrials having an extremely high energy product $(BH_{max})$. Recently, grain oriented material with energy product values of 30–47 MGOe (mega-gauss-oersteds) have become generally available.

The primary disadvantage of brushless motors is the extra expense and technology required in the electric commutation of the windings.

SUMMARY

It is an object of the present invention to optimize the construction of rotating field devices in ways not available to those devices operating with brushes nor are practiced in the state of the art of brushless motors in order to enhance performance while at the same time reduce manufacturing costs dramatically enough to compensate for any costs in providing the electronic commutaition functions.

This invention is directed toward a rotating magnetic field device such as for a dc PM motor having a PM rotor, field winding mounted on a loom such that the windings enclose the rotor and a yoke which is basically a cyclinder that encloses the windings and rotor and is formed by a cylindrical wrap of wire having an electrically insulating coating and formed from ferromagnetic material such as silicon steel.

DESCRIPTION OF PREFERRED EMBODIMENTS

Figure 3:
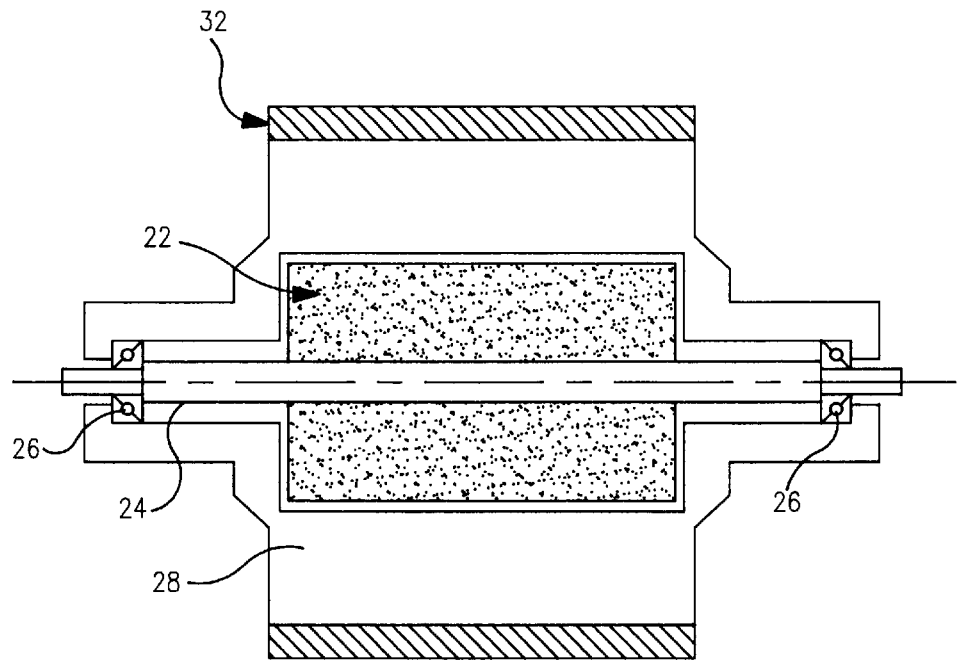
FIG. 3 is a sectional view along the radius of the present invention.
Figure 4:
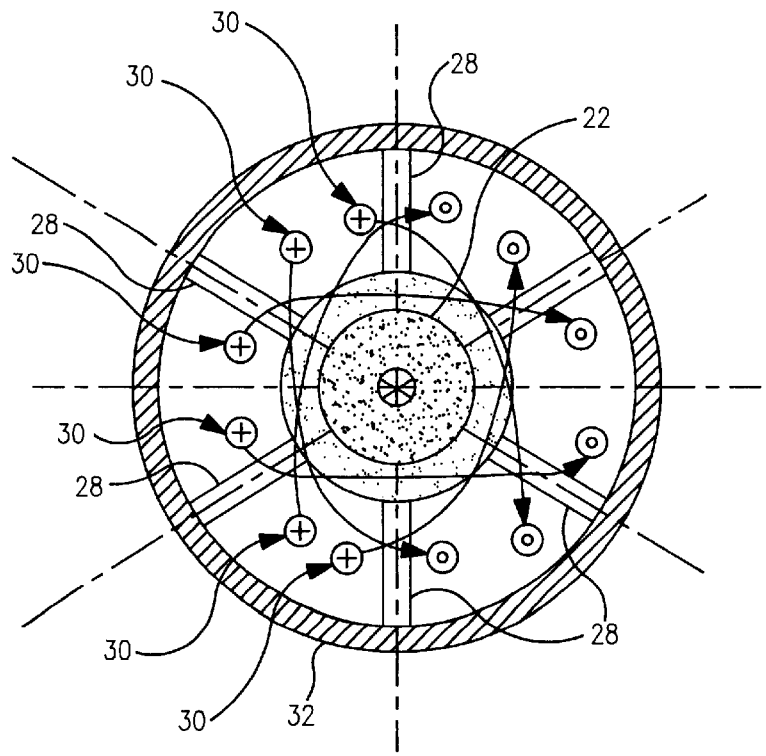
FIG. 4 is a sectional view along the axis of the present invention.

Turning now to a discussion of the figs., FIG. 3 is a sectional view looking in the radial direction and FIG. 4 is a sectional view looking in the axial direction showing the general arrangement of the rotating field device of the present invention. The winding arrangement is for a three phase motor. There are shown:

- a rotor 22 comprising a cylindrical high energy magnet formed to accept a shaft 24 along its axial center and bonded to the shaft 24 by any one of several means known in the bonding arts. The shaft 24 is also ground to provide positional fixturing for bearings 26 (or bushings) at appropriate locations near each end;
- a frame 28 (winding loom) preferably molded in parts which are assembled around, and capture, the rotor 22, shaft 24 and bearing/bushing assembly 26;
- windings 30 which are loops (two loops for each phase winding are shown) of preferably copper magnet wire, wound or laid into the winding loom in accordance with a Windings Map example of FIG. 4 as shown. The + sign on the end of a winding indicates the winding extending into the paper and the − sign indicates the winding extending out of the paper.
- a cylinder 32 consisting of a coil of electrically insulated annealed iron or silicon steel wire wound about the frame perimeter or, in the form of a "free-standing" coil, slid over the perimeter of the frame and bonded or otherwise secured in place. The insulation coating on the wire is preferably a thin organic coating well known in the art or an xidation coating also known in the art.

Figure 5:
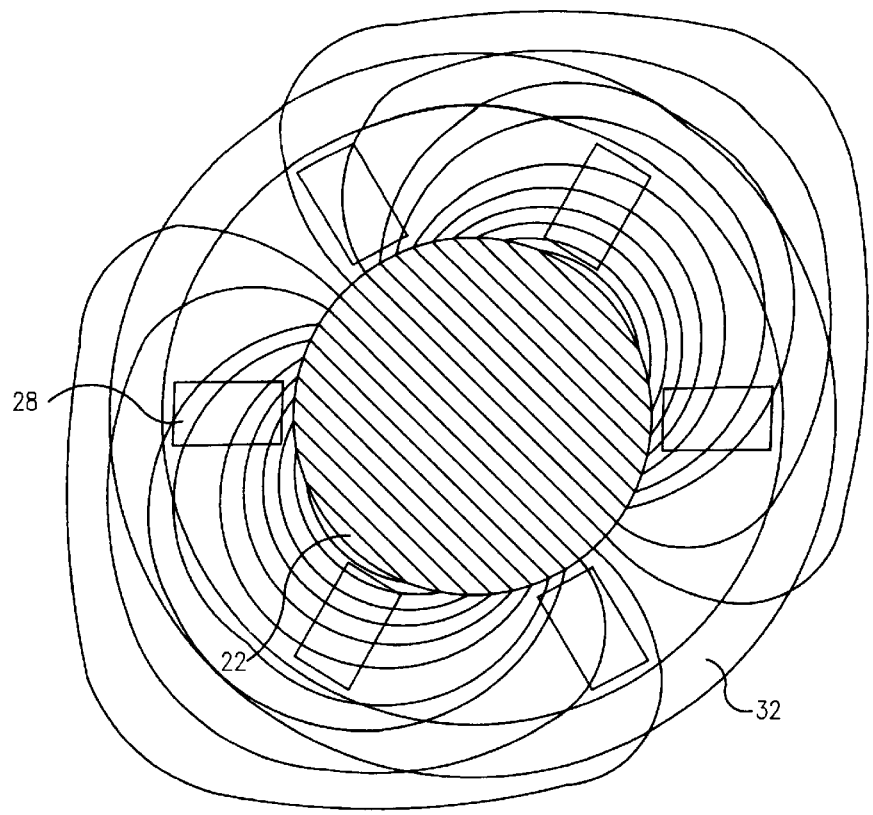
FIG. 5 shows the flux pattern of the rotor magnet without the stator.
Figure 6:
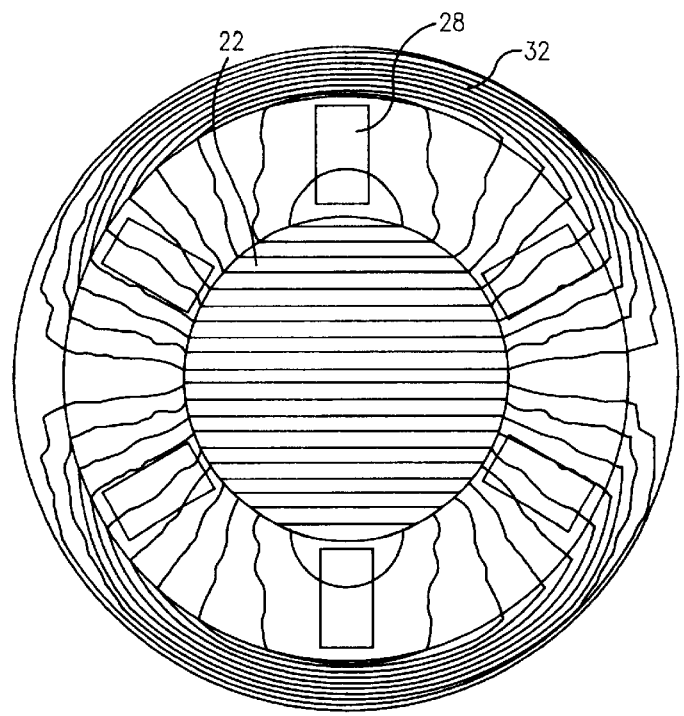
FIG. 6 shows the flux pattern of the rotor magnet with the stator of this invention.

FIG. 5 is a sectional view showing the flux pattern for the rotor magnet of the present invention without a yoke. The same rotor magnet with the addition of a magnetically permeable cylinder 32 is shown in FIG. 6. It is seen that the yoke not only contains the stray flux but also focuses the field in the direction of the magnet poles.

Figure 1:
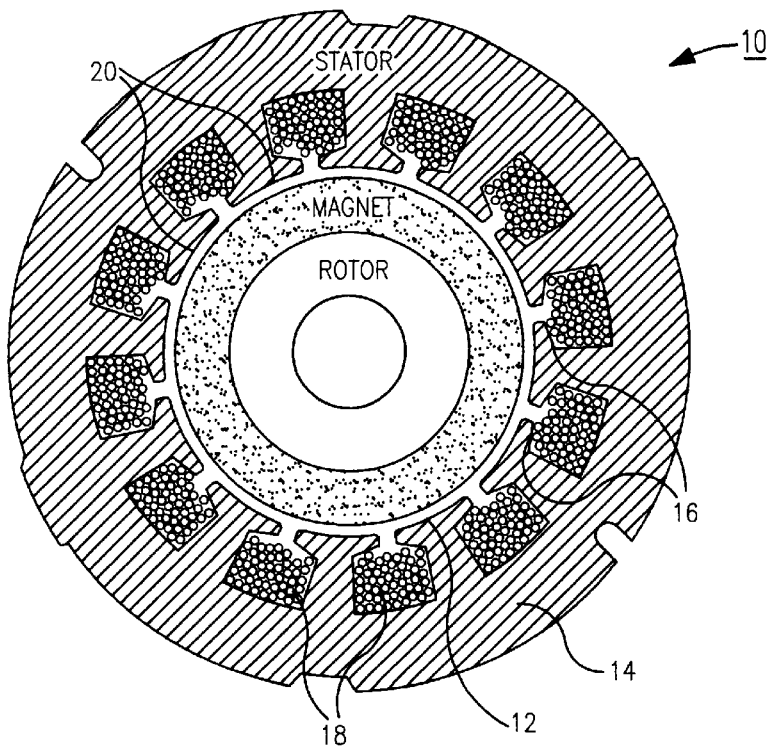
FIG. 1 shows a section of a conventional rotating field device such as a dc PM motor.
Figure 2:
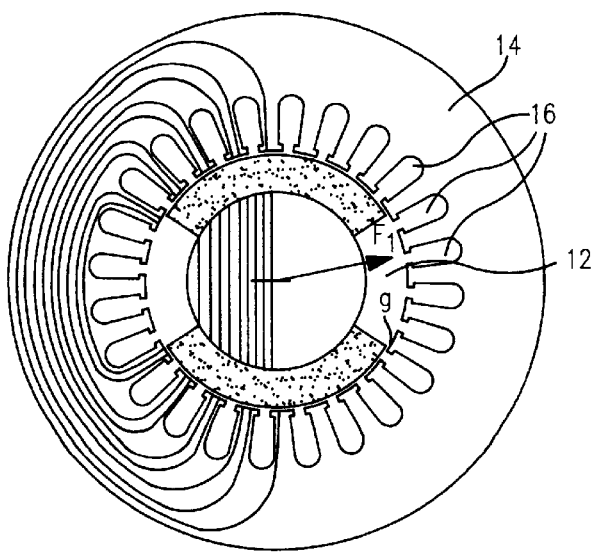
FIG. 2 shows the flux pattern of the section of FIG. 1.

As shown in FIG. 4, the loops of each winding 30 are arranged so that each coil 30 surrounds the rotor magnet 22. The flux generated by any phase loop 30 closely resembles the flux pattern from the rotor magnet 22 as plotted in FIG. 5. Whenever a phase winding is energized, the field it generates will interact with the field of the rotor magnet 22 to form an "alignment" torque, which tends to rotate the rotor magnet field into alignment with the field generated by the phase winding. Such an alignment torque is not subject to the torque ripple discussed in connection with the conventional variable reluctance motor discussed in connection with FIG. 1 since there is no reluctance torque generated.

Since the yoke 32 in the present invention is in the form of a cylinder, it is a feature of this invention that the yoke 32 be manufactured by winding annealed iron or silicon steel wire of relatively high gauge (small diameter) into a coil of sufficient thickness to provide the needed magnetic permeance. This unique form of construction is very cost effective compared to the present art. If the stator coil is impregnated with an epoxy or similar resin, the yoke 32 will be free standing to provide ease of assembly and impart structural stability.

Figure 7A:
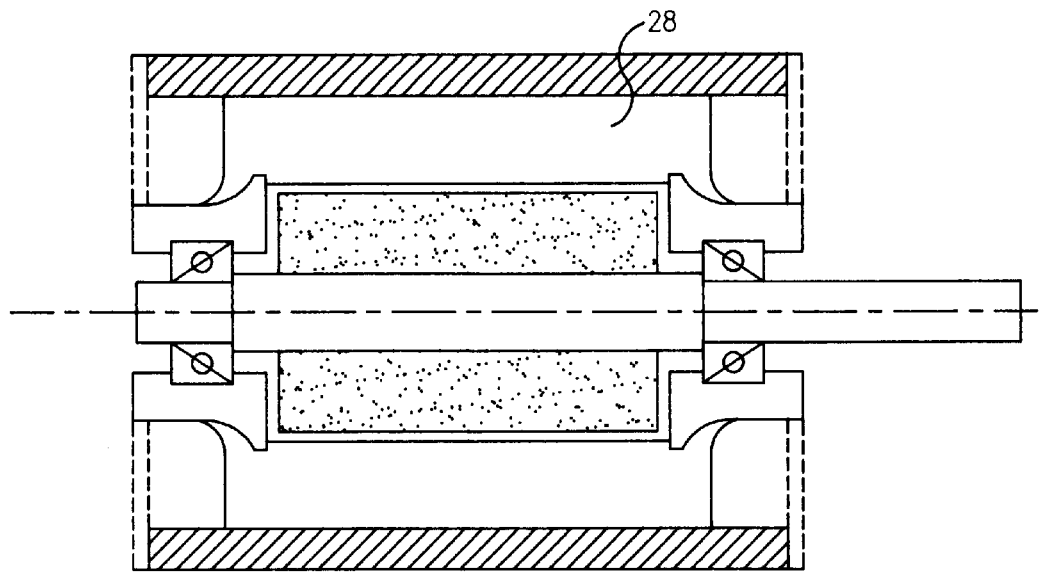
FIG. 7A is a sectional radial view of the motor of this invention.
Figure 7B:
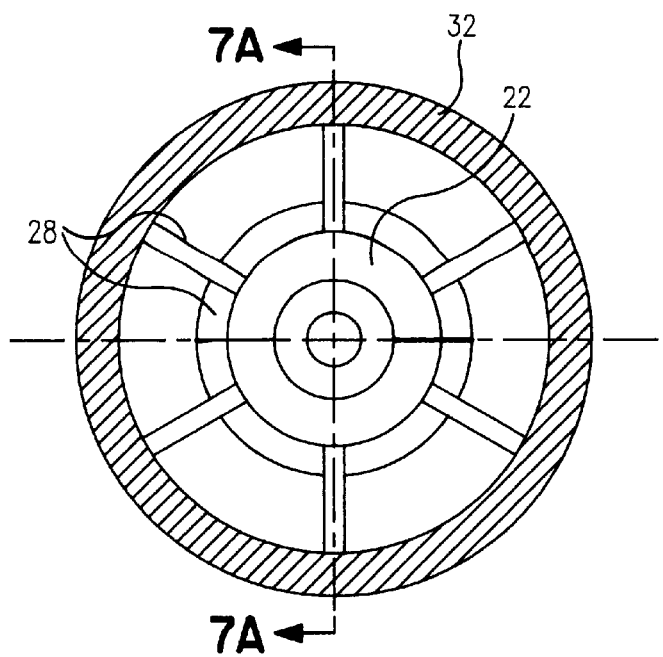
FIG. 7B is a sectional axial view of the motor of this invention.

The frame of the rotating field device as shown to better advantage in FIG. 7A looking along the radial direction and FIG. 7B looking along the axial direction, preferably consists of two molded high temperature plastic parts, an upper and a lower frame. At each end is a nose piece designed to capture the front and rear bearing or bushing. Center ribs 28 provide a loom (or support piece) upon which the field coils (not shown in FIGS. 7A and B) are wound and enclose the rotor magnet.

FIGS. 3–7A and B show a typical configuration of a small three phase field device of the invention. For two phase windings, the four ribs would be placed at 90 degree positions with respect to one another and the mold line for joining the two halves of the frame would occur 45 dgrees from one oppsing pair of ribs.

Assembly of the device consists of placing the rotor with bearings on the shaft into position against the bearing shoulders. The assembly is then placed into one of the frame sections with the bearings seated in their slots in the nose pieces. The second frame section is then bonded into position above the rotor to capture the rotor assembly. Field coil windings are then placed in their appropriate positions on the frame, for example, in accordance with the wiring map of FIG. 4. The yoke is then slid into place over the frame and bonded thereto.

A permanent magnet rotating field device such as a dc or ac motor or generator, alternator or tachometer has been described whose novel wire wound stator construction provides improved efficiency of performance, elimination of ripple (cogging) and economy of construction compared to devices of the prior art. An important feature of the invention is based on our discovery that when the permanent magnet rotor is constructed using material having an energy product in the range 0.30–47 MGOe, these magnets generate such a large field, even in air, that the small gaps of a conventional motor design are not necessary and the wire wound cylindrical stator of the present invention is a viable alternative.

Figure 8:
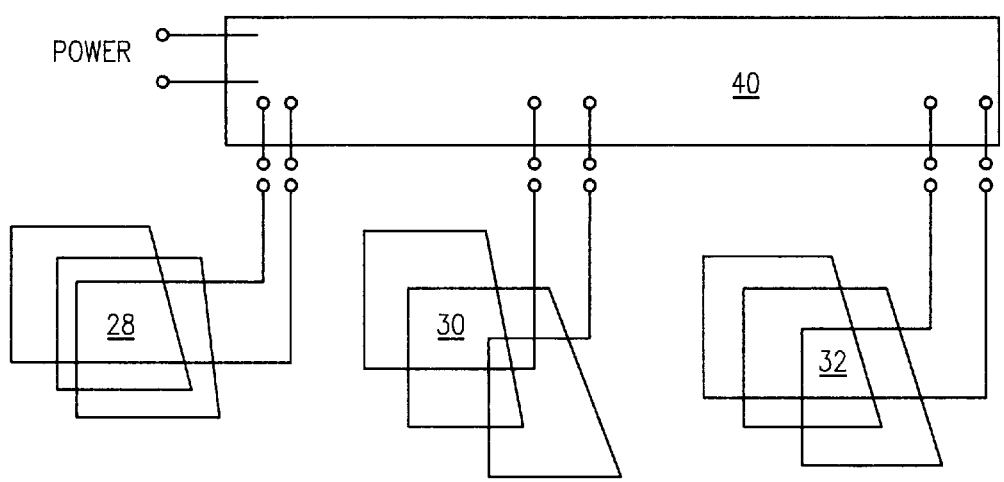
FIG. 8 illustrates the various applications of the rotating magnetic field device.

FIG. 8 illustrates the use of the rotating field device with three field windings (shown laid out in the plane of the paper for better illustrating the connections) having a pair of terminals for each winding such that:

(i) when the rotor is turned by an external mechanical force, the device is an ac voltage generator, (ii) when a three phase voltage is operably applied to the terminals of the windings, (one voltage phase to one winding, respectively) a field alignment torque is generated and the device functions as an ac motor.

(iii) when the terminals are connected to a threephase rectifier 40 (well known in the art), a dc voltage is generated across the output terminals of the rectifier so that the device is a dc generator.

(iv) when the terminals are connected to a switching circuit 40 operatively arranged with a sensor for detecting rotational position of the rotor such as an optical, Hall effect or magnetic sensor, such that the circuit 40 successively switches dc current from one winding to the next so that the circuit operates a dc motor. In this application, the novel stator construction permits "spreading out" the field windings around the axis of rotation.

It will also be understood by one having ordinary skill in the art that the device, arranged in the appropriate configuration seleced from (i)–(iv) above, can function as a tachometer or alternator.

Other variations and modifications of the preferred embodiment may be suggested by reading the specification and studying the invention which are within the scope of the invention.

For example, the cylindrical stator winding may be formed using square wire to reduce the volume of the stator and losses in air.

While the preferred material comprising the rotor magnet is neodymium-iron-boron compound, other magnetic materials may be substituted for any one of a number of reasons such as cost and availability.

We therefore wish to define the scope of our invention by the scope of the appended claims.

What is claimed is:

1. A permanent magnet rotating field device comprising:
   a rotor having a single permanent magnet mounted on a shaft;
   said permanent magnet having a flux field extending perpendicularly through said shaft;
   a frame means for rotatably supporting said rotor;
   a plurality of field windings mounted in said frame means and surrounding said rotor;
   each winding being formed of a single wire wound continuously to form said respective winding;
   each winding corresponding to an electrical phase of a multiphase voltage which is one of:
      (i) electrical power applied to said windings when said device is operated as a multiphase motor;
      (ii) a electrical power generated when said device is operated as a multiphase generator;
   a magnetically permeable cylinder enclosing said frame, plurality of windings and rotor;
   said permanent magnet and said magnetically permeable cylinder providing a flux field having a pattern of flux density throughout a region which includes the magnetically permeable cylinder, the permanent magnet and the space occupied by the frame;
   each said winding oriented with respect to said other windings to provide that when a direct current is passed in succession through each one of said windings, a magnetic field is generated that is substantially uniform and is perpendicular to said axis of said rotor in the region occupied by said rotor and rotates in a plane that is perpendicular to said axis of said rotor;
   said field windings being adapted for operable connection to one of:
      (i) current switching means for successive connection between a source of dc voltage and each winding of said plurality of windings such that as said rotor rotates, said current switching means switches a dc current from one said each winding to another one of said each winding generating a field alignment torque between said rotor magnet and said each field winding;
      (ii) current switching means for successive connection to each winding of said plurality of windings such that as said rotor is rotated, a dc voltage is generated between a pair of terminals of said current switching means;
      (iii) a source of ac voltage such that a field alignment torque is generated between said rotor magnet and said each field winding;
      (iv) a pair of output terminals whereby an ac voltage is generated between said output terminals when said rotor is rotated.

2. The device of claim 1 wherein said permanent magnet rotor comprises a compound of neodymium-iron-boron.

3. The device of claim 1 wherein said cylinder comprises magnetically permeable wire wound in a tangential direction to form said cylinder.

4. The device of claim 3 wherein said cylinder comprising magnetically permeable wire having an electrically insulating coating and wound in a tangential direction to form said cylindrical stator is impregnated with a thermosetting polymer.

5. The device of claim 3 wherein said magnetically permeable wire is selected from a group of metals that consists of silicon iron and steel.

6. The device of claim 1 wherein said plurality of field windings is three field windings and said field windings are adapted for connection to an ac three phase voltage such that said device operates as a three phase motor.

7. The device of claim 1 wherein said plurality of field windings is two field windings adapted for connection to a single phase ac voltage source such that said motor operates as an ac motor.

8. The device of claim 1 comprising:
   each said field winding surrounding said rotor;
   current switching means adapted for successive connection between a source of dc voltage and each winding of said plurality of windings such that as said rotor rotates, said current switching means switches a dc current from one said each winding to another one of said each winding generating a field alignment torque between said rotor magnet and said each field winding;
   each said field winding arranged in relation to said other field windings such as to eliminate torque ripple.

9. The rotating field device of claim 1 wherein said frame means is made from a material selected from a group of materials that consists of a high temperature resistant plastic, composite glass, and a composite containing carbon fiber.

10. The rotating field device of claim 1 wherein said frame means comprises rib means for securing location of each field winding in said frame means.

11. The rotating field device of claim 1 wherein said cylinder is formed from a magnetically permeable sintered powder that is electrically non-conducting.

12. The rotating field device wherein permanent magnet is made of material having an energy product in the range 30 MGOe to 47 MGOe.

* * * * *